(12) United States Patent
Dema et al.

(10) Patent No.: US 12,361,302 B2
(45) Date of Patent: Jul. 15, 2025

(54) INTERPRETABLE MACHINE LEARNING FOR DATA AT SCALE

(71) Applicant: Microsoft Technology Licensing, LLC, Redmond, WA (US)

(72) Inventors: Mesfin Adane Dema, Allen, TX (US); Jugal Parikh, Sammamish, WA (US); Kristian Holsheimer, Southport (AU); Fuchen Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1081 days.

(21) Appl. No.: 17/335,003

(22) Filed: May 31, 2021

(65) Prior Publication Data

US 2022/0383157 A1    Dec. 1, 2022

(51) Int. Cl.
  *G06N 5/04* (2023.01)
  *G06N 20/00* (2019.01)
(52) U.S. Cl.
  CPC ............... *G06N 5/04* (2013.01); *G06N 20/00* (2019.01)
(58) Field of Classification Search
  CPC .................................. G06N 5/04; G06N 20/00
  See application file for complete search history.

(56) References Cited

U.S. PATENT DOCUMENTS

| | | | |
|---|---|---|---|
| 10,521,413 B2 | 12/2019 | Pappu et al. | |
| 10,747,957 B2 | 8/2020 | Wohlwend | |
| 2020/0034752 A1 | 1/2020 | Luo et al. | |
| 2020/0097809 A1 | 3/2020 | Velasco et al. | |
| 2020/0387570 A1 | 12/2020 | Biswas et al. | |
| 2022/0284485 A1* | 9/2022 | Swift | G06F 40/20 |
| 2022/0309315 A1* | 9/2022 | Aladahalli | G06N 3/084 |
| 2022/0366315 A1* | 11/2022 | Desreumaux | G06N 20/20 |

OTHER PUBLICATIONS

[Submitted on Jul. 21, 2020] Melody: Generating and Visualizing Machine Learning Model Summary to Understand Data and Classifiers Together https://arxiv.org/pdf/2007.10614; Gromit Yeuk-Yin Chan (Year: 2020).*
Generating End-to-End Adversarial Examples for Malware Classifiers Using Explainability Ishai Rosenberg and Shai Meir and Jonathan Berrebi and Ilay Gordon and Guillaume Sicard and Eli (Omid) David Deep Instinct Ltd (Year: 2020).*
Robust Hashing for Models; https://dl.acm.org/doi/pdf/10.1145/3239372.3239405 (Year: 2018).*

(Continued)

*Primary Examiner* — Alan Chen
(74) *Attorney, Agent, or Firm* — Schwegman Lundberg & Woessner, P.A.

(57) ABSTRACT

In systems for interpreting the predictions of a machine learning model with the help of a surrogate model, feature vectors of inputs to the machine learning model can be grouped based on locality sensitive hashes or other hashes that reflect similarity between the feature vectors in matching hash values. For a given prediction to be interpreted and the corresponding input feature vector, a suitable training dataset for the surrogate model can then be obtained at low computational cost by hashing the input feature vector and retrieving stored feature vectors with matching hash values, along with their respective predictions.

20 Claims, 6 Drawing Sheets

(56) References Cited

OTHER PUBLICATIONS

Embedded YARA rules: strengthening YARA rules utilising fuzzy hashing and fuzzy rules for malware analysis; Nitin Naik1 • Paul Jenkins2 • Nick Savage2 • Longzhi Yang3 • Tossapon Boongoen4 • Natthakan Iam-On4 • Kshirasagar Naik5 • Jingping Song, (Year: 2020).*
https://arxiv.org/pdf/1711.08797 Practical Hash Functions for Similarity Estimation and Dimensionality Reduction Søren Dahlgaard1,2, Mathias Bæk Tejs Knudsen1,2, and Mikkel Thorup (Year: 2017).*
https://arxiv.org/pdf/1704.02685 Learning Important Features Through Propagating Activation Differences Avanti Shrikumar 1 Peyton Greenside 1 Anshul Kundaje 1 (Year: 2019).*
Laugel et al., Defining Locality for Surrogates in Post-hoc Interpretablity, arXiv:1806.07498v1 [cs.LG] Jun. 19, 2018; pp. 47-53 (Year: 2018).*
Poyiadzi et al., On the overlooked issue of defining explanation objectives for local-surrogate explainers, arXiv:2106.05810v1 [cs.LG] Jun. 10, 2021; Total pp. 5 (Year: 2021).*
Chan, et al., "Melody: Generating and Visualizing Machine Learning Model Summary to Understand Data and Classifiers Together", In Repository of arXiv:2007.10614v1, Jul. 21, 2020, 16 Pages.
Grauman, et al., "Visual Object Recognition", In Synthesis Lectures on Computer Vision, Jan. 27, 2011, 172 Pages.
"International Search Report and Written Opinion Issued in PCT Application No. PCT/US22/027953", Mailed Date: Jul. 19, 2022, 13 Pages.
Rosenberg, et al., "Generating End-to-End Adversarial Examples for Malware Classifiers Using Explainability", In Proceedings of International Joint Conference on Neural Networks, Jul. 19, 2020, 10 Pages.
"Building a Real-Time Embeddings Similarity Matching System", Retrieved From: https://cloud.google.com/solutions/machine-learning/building-real-time-embeddings-similarity-matching-system#approximate_similarity_matching, Retrieved Date: Mar. 26, 2021, 30 Pages.
"Context-based similar documents", Retrieved From: https://blogdotrichanchordotcom.wordpress.com/2016/01/22/context-based-similar-documents/, Jan. 22, 2016, 6 Pages.
"Implementing Context-Based Similar Documents With Python",Retrieved From: https://dashdotdash.wordpress.com/2016/03/04/implementing-context-based-similar-documents-with-python/ ,Retrieved Date: Mar. 26, 2021, 4 Pages.
"Local Surrogate (LIME)", Retrieved From: https://christophm.github.io/interpretable-ml-book/lime.html#lime-for-text, Retrieved Date: Mar. 26, 2021, 10 Pages.
Sceller, et al., "SONAR: Automatic Detection of Cyber Security Events over the Twitter Stream", Retrieved From: https://www.researchgate.net/publication/319048233_SONAR_Automatic_Detection_of_Cyber_Security_Events_over_the_Twitter_Stream, Aug. 29, 2017, 11 Pages.
"Understanding Word2Vec and Doc2Vec", Retrieved From: https://shuzhanfan.github.io/2018/08/understanding-word2vec-and-doc2vec/ , Retrieved Date: Mar. 26, 2021. 7 Pages.
Beck, Melanie, "ML Security Pro Tips: Understanding MinHash in a Security Context", Retrieved From: https://medium.com/ai-ml-at-symantec/ai-ml-security-pro-tips-understanding-minhash-in-a-security-context-3dd0dd2ffe8 Feb. 25, 2019, 13 Pages.
Gupta, Shikhar, "Locality Sensitive Hashing An effective way of reducing the dimensionality of your data", Retrieved From: https://towardsdatascience.com/understanding-locality-sensitive-hashing-49f6d1f6134, Jun. 29, 2018, 17 Pages.
Hanna, et al., MinHashing and LSH—dimensionality reduction for finding similar items among massive datasets, Part 2, Retrieved From: https://www.riskiq.com/blog/labs/minhashing-and-ish-dimensionality-reduction-for-finding-similar-items-among-massive-datasets-part-2/, Feb. 16, 2015, 13 Pages.
Mitra, et al., "A Dual Embedding Space Model for Document Ranking", In Repository of arXiv:1602.01137,Feb. 2, 2016, 10 Pages.
Kumar, Ravi "Locality Sensitive Hashing", Retrieved From: https://web.archive.org/web/20171115040909/https://users.soe.ucsc.edu/~niejiazhong/slides/kumar.pdf, Nov. 15, 2017, 50 Pages.

* cited by examiner

INTERPRETABLE MACHINE LEARNING FOR DATA AT SCALE

BACKGROUND

In recent years, artificial intelligence (AI), specifically machine learning, has undergone significant performance improvements on inference tasks due to the introduction of deep learning and other complex models. However, these models, despite their higher performance, have not enjoyed wide-spread use, as they tend to be difficult to interpret. The interpretability of machine-generated decisions, or "predictions," is important for transparency and accountability—an aspect of what has come to be known as "responsible AI." Therefore, many industries relying on machine learning for daily task, including, in particular, highly regulated industries like healthcare, banking, and human resources, have not been able to take advantage of recent performance advances that come at the cost of interpretability. Various approaches have been proposed to address this limitation and provide interpretations of the predictions of complex machine learning models; among them are Local Interpretable Model-Agnostic Explanations (LIME) and SHapley Additive exPlanations (SHAP). These algorithms generally rely on understanding the neighbors of a given observation that is provided as an input datapoint to a machine learning model, and attempt to extract relevant attributes of the local neighborhood to interpret the prediction of the complex machine learning model. To achieve that, these algorithms may involve generating synthetic data in the proximity of the observed sample by perturbing the features, which at times introduces unrealistic samples, in addition to being computationally expensive to use at scale. Accordingly, there is still a need for new approaches that provide interpretations of machine learning model predictions at scale more efficiently.

BRIEF DESCRIPTION OF THE DRAWINGS

Various computer-implemented systems and methods for interpreting the predictions of a machine learning model are described herein with reference to the accompanying drawings, in which.

DESCRIPTION

Figure 1:
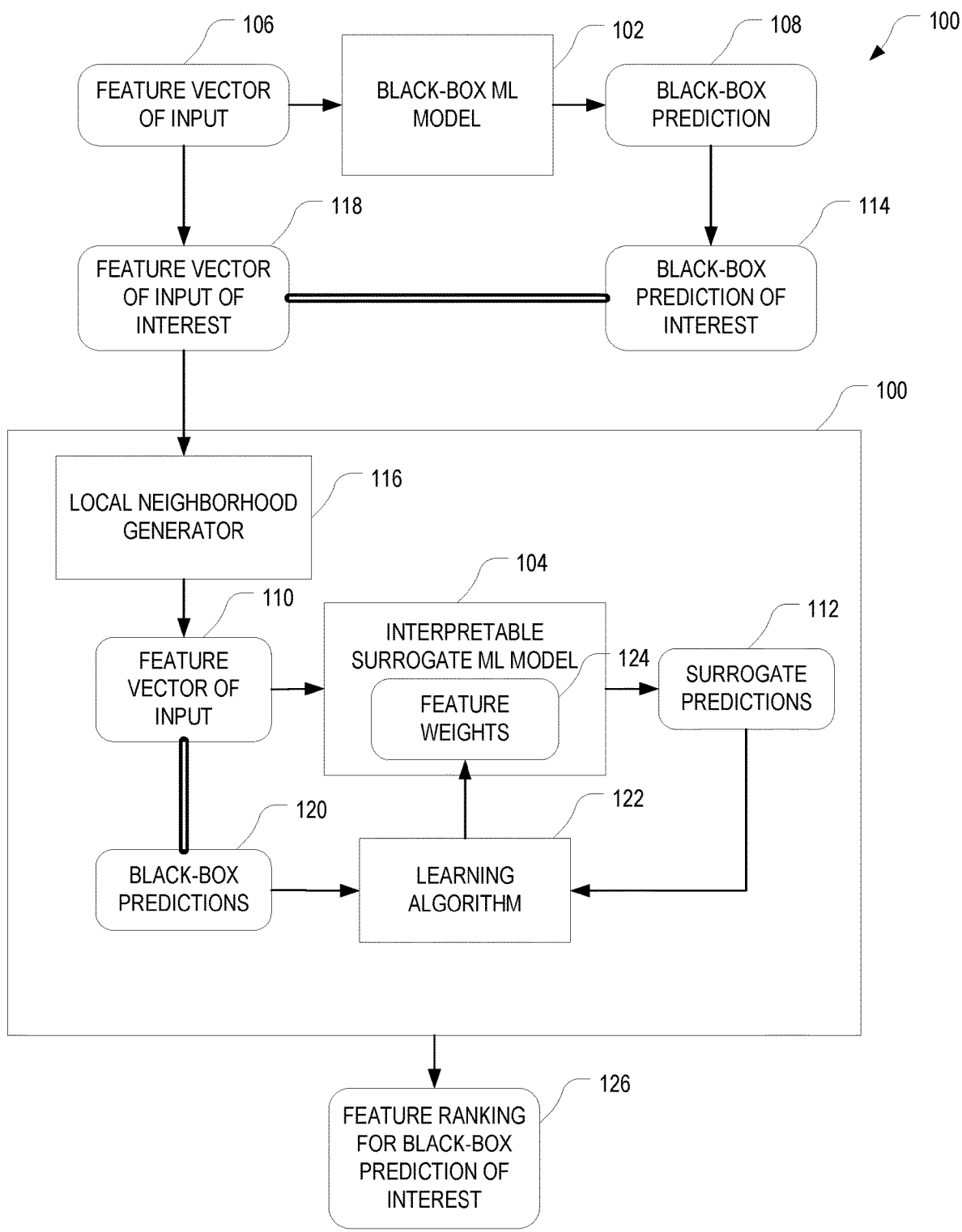
FIG. 1 is a schematic block diagram of a system for interpreting the predictions of a machine learning model using an interpretable surrogate model, in accordance various embodiments.

Described herein is a computer-implemented approach to interpreting the predictions of machine learning models which themselves do not provide insight into the reasons for their predictions, hereinafter also "black-box" ML models, with the help of interpretable local "surrogate" machine learning models that locally approximate the behavior of the black-box models. For a given input datapoint (or simply "datapoint" or "input") of interest, the surrogate model can be trained, in a supervised manner, based on similar inputs that form the "local neighborhood" of the input of interest, using the predictions made for these inputs by the black-box model as ground-truth labels. The surrogate model operates on a set of (at least two, although in most cases more) features of the inputs, e.g., a subset or simplification of the features that are utilized by the black-box model. In the course of training the surrogate model to make by and large the same predictions as the black-box model at least in the local neighborhood of the input of interest, weights associated with the various features are determined, and those feature weights inherently provide insight into the relative contributions of the features to the prediction. To illustrate, consider the task of classifying emails based on their text into benign and malicious emails. The features in this case may be the presence or absence of each of a set of words, or the frequency of occurrence of each word, in the text of the email. A larger weight associated with a given word would signify that the classification of the email is based in large part on that word.

One way of obtaining training data for the surrogate model is to derive the training inputs in the local neighborhood of the input of interest directly from the input of interest by perturbing the input of interest, that is, slightly varying some of the features. For example, from a given email or other text document, similar emails or text documents can be derived by omitting different combinations of words. The derived inputs, which are similar to the input of interest by design, can then be fed into the black-box model to generate the labels used in training the surrogate model. Alternatively, datapoints within the local neighborhood of a given input of interest can be identified within an existing dataset, such as the training dataset used for the black-box model, by computing pairwise similarity between the input of interest and the inputs in the existing dataset. In either case, the computational cost of generating the training data for the surrogate models is substantial.

In accordance with various embodiments, determining the training data for the surrogate model is facilitated by grouping input datapoints by similarity upfront, e.g., during training of the black-box model. Then, at the time the prediction for an input of interest is to be interpreted, the input of interest can be assigned to one of the groups, again based on similarity, and the datapoints within that group, which constitute the local neighborhood of the input of interest, can be retrieved, along with their previously determined predictions, to serve as the training dataset for the surrogate model. The grouping by similarity can be accomplished with "fuzzy hashing," or more specifically with locality sensitive hashing (LSH), which by design tends to assign matching hash values to similar datapoints. The particular hashing function utilized depends on the metric of similarity. For example, as explained in more detail below, using Jaccard similarity to measure the degree of overlap between two feature sets, min-hashing is a suitable choice. Beneficially, using LSH allows finding similar datapoints at much lower computational cost than performing pairwise comparisons or generating synthetic data near the point of interest through feature perturbations. Once a set of datapoints have been characterized in terms of locality sensitive hash values, computing the hash value(s) for a new datapoint allows readily determining similar datapoints. If, for example, the set of datapoints is sorted into "buckets" within each of which the datapoints share a common locality sensitive hash value, then the hash value computed for a new datapoint immediately identifies the bucket of similar datapoints.

The foregoing summary will be more readily understood from the following detailed description of the drawings.

Figure 5:
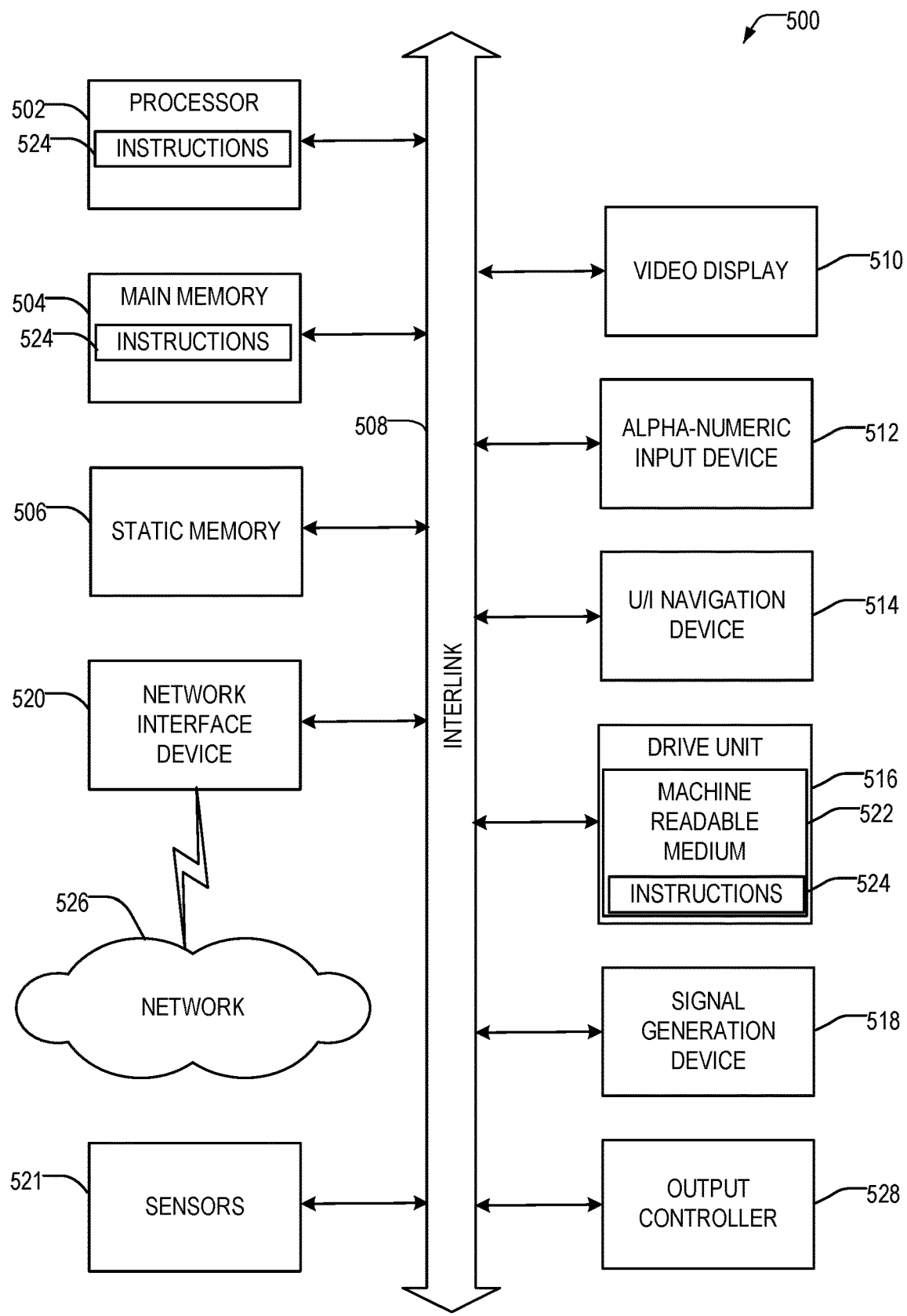
FIG. 5 is a block diagram of an example machine that may perform any one or more of the methods discussed herein.

FIG. 1 is a schematic block diagram of a system 100 for interpreting the predictions of a machine learning (ML) model 102 using an interpretable surrogate model 104, in accordance various embodiments. The machine learning model 102 and system 100 for interpreting its predictions may be implemented in software, e.g., executed by one or general-purpose processors of a computer, with a combination of software and hardware accelerators, or generally with any suitable combination of software and/or hardware; FIG. 5 illustrates an example machine for implementing the system 100.

The machine learning model 102 may be, for example, a neural network model, Bayesian classifier, decision tree or forest, or generally any kind of model, learned from data, that operates on a set of features extracted from an input, herein collectively the "feature vector" 106, to produce an output, herein referred to as a "prediction" 108 (without implying any limitation as to the nature of the output). The machine learning model 102 may, for instance, be a classifier model whose predictions 108 correspond to the classes into which the inputs are sorted, or a regression model that outputs a numerical value as its prediction 108. The raw inputs from which the feature vectors 106 are determined may be, without limitation, text, images, tabular data, audio data or other time-varying signals, etc. To list but a few illustrative applications, the machine learning model 102 may, for example, classify legal documents as privileged/non-privileged, analyze radiology images to make medical diagnoses, evaluate the categorical and/or numerical information contained in a loan application to compute a qualified loan amount, or process a voice recording to identify the speaker. In these and other contexts, it is often important to understand how the model 102 arrives at a certain prediction, especially if that prediction is wrong or inconsistent with the conclusion a human would arrive at. Understanding the origin of an erroneous document classification or image-based medical diagnosis may, for example, help improve the model accuracy. Or, in the case of a loan application, the applicant may want to know the reasons for the approved loan amount. Often, however, the machine learning model 102 is so complex and non-intuitive in its operation that its predictions 108 are not easily interpretable—in other words, the machine learning model 102 may be, from the perspective of humans, a "black box."

In accordance with various embodiment, the predictions of the black-box machine-learning model 102 are interpreted using a surrogate machine learning model 104 trained to locally mimic the behavior of the black-box model 102. Like the black-box model 102, the surrogate model 104 takes a feature vector 110 as input, and outputs a prediction 112 (herein also "surrogate prediction" to distinguish it from the prediction 108 made by the black-box model 102) computed from the feature vector 110. Unlike the black-box model 102, the surrogate model 104 is interpretable by a human in that its prediction 112 can be readily linked to the features within the feature vector 110 that are responsible for the prediction 112. Such interpretability can result from the choice of surrogate model 104, lower dimensionality of the feature vector 110, or a combination of both. Machine learning model types that intrinsically lend themselves to interpretation, and thus for use as the surrogate model 104, include, for example and without limitation, linear models such as linear or logistic regression models, least absolute shrinkage and selection operator (LASSO) models, decision trees, and naïve Bayes classifiers. In some embodiments, the feature vector 110 input to the surrogate model 104 includes only a subset of (at least two of) the features that form the feature vector 106 on which the black-box model 102 operates.

The interpretability of the surrogate model 104 is generally gained by merely locally approximating the behavior of the black-box model 102. That is, for any given input of interest whose associated black-box prediction 114 is to be interpreted, the surrogate model 104 is trained to mimic the black-box model 102 within a neighborhood of datapoints similar to the input of interest, rather than across the global range of inputs to the black box model 102. In various embodiments, as shown, the system 100 for interpreting the outputs of the black-box model 102 includes, in addition to the surrogate model 104, a local neighborhood generator 116 that determines, from a feature vector of the input of interest 118, a set of feature vectors 110 in its vicinity on which the surrogate model 104 will be trained. The set of feature vectors 110 includes generally at least two feature vectors 110, though in practice, to achieve good accuracy of the surrogate model 104, many feature vectors 110 (e.g., tens, hundreds, or thousands of feature vectors, depending on availability and the complexity of the surrogate model 104) may be used. In many scenarios, the feature vector of interest 118 will be sparse, meaning that it is zero for a large number of features available in the global feature representation utilized by the black-box model 102. This allows for a lower-dimensional representation of the feature vector of interest 118 and its local neighborhood of feature vectors 110, e.g., where the feature vectors 110 include only the subset of the global set of features that were non-zero in the feature vector of interest 118.

The local neighborhood generator 116 obtains the predictions 120 of black-box model for the feature vectors 110 in the vicinity of the feature vector of interest 118, and provides the local neighborhood of feature vectors 110 and associated black-box predictions 120 to the surrogate model 104 as training data. Whereas in conventional approaches, the feature vectors 110 in the local neighborhood are often created from the feature vector of interest 118 upon receipt of the latter, and are then fed into the black-box model 102 to compute the black-box predictions 120, the local neighborhood generator 116 contemplated herein simply retrieves a set of feature vectors 110 and black-box predictions 120 that are identified among previously computed and stored pairs of inputs and outputs of the black-box model 102, using fuzzy hashing, as explained in more detail with reference to FIG. 2. This new approach drastically reduces machine resources utilized in interpreting the predictions of the black-box model 102, thus enabling interpretations for data at larger scale.

The system 100 for interpreting the predictions of the black-box model 102 further includes a learning algorithm 122 that determines the structure and/or adjustable parameters, including in particular feature weights 124, of the surrogate model 104 in a supervised manner based on the training data of input feature vectors 110 and associated black-box predictions 120. This process generally involves iteratively minimizing a cost or loss function that measures the discrepancy between the surrogate predictions 112 generated from the feature vectors 110 by the surrogate model 104 and the black-box predictions 120 for those feature vectors 110, which serve as the labels. The particular learning algorithm 122 generally depends on the type of surrogate model 104. For instance, a regression model may be learned by regression analysis, a decision tree may be learned with a greedy algorithm, and the parameters of a naïve Bayes classifier may be learned using maximum likelihood estimation. Suitable supervised training algorithms are generally known to those of ordinary skill in the art.

Upon completion of the surrogate model training 104, the weights 124 associated with the various features of the input feature vectors 110 are fixed. These feature weights 124 represent the relative importance of the different input features in determining the prediction. Accordingly, a ranking 126 of the feature weights 124 of the surrogate model 104 upon training the model 104 based on a local neighborhood of the input of interest constitutes an interpretation of the associate black-box label of interest 114, and as such the output of the system 100. The feature ranking 126, or a subset of the features obtained by comparison of their feature weights against a set threshold, may be displayed or otherwise communicated to a user, and/or used as input to various automatic algorithms. For example, in some embodiments, the feature ranking 126 is used to manually or automatically refine the black-box model 102, e.g., by removing (high-ranking) features responsible for an erroneous prediction from the feature representation utilized by the model 102, or by omitting low-ranking features, which have little predictive value, from the feature representation to improve efficiency.

Figure 2A:
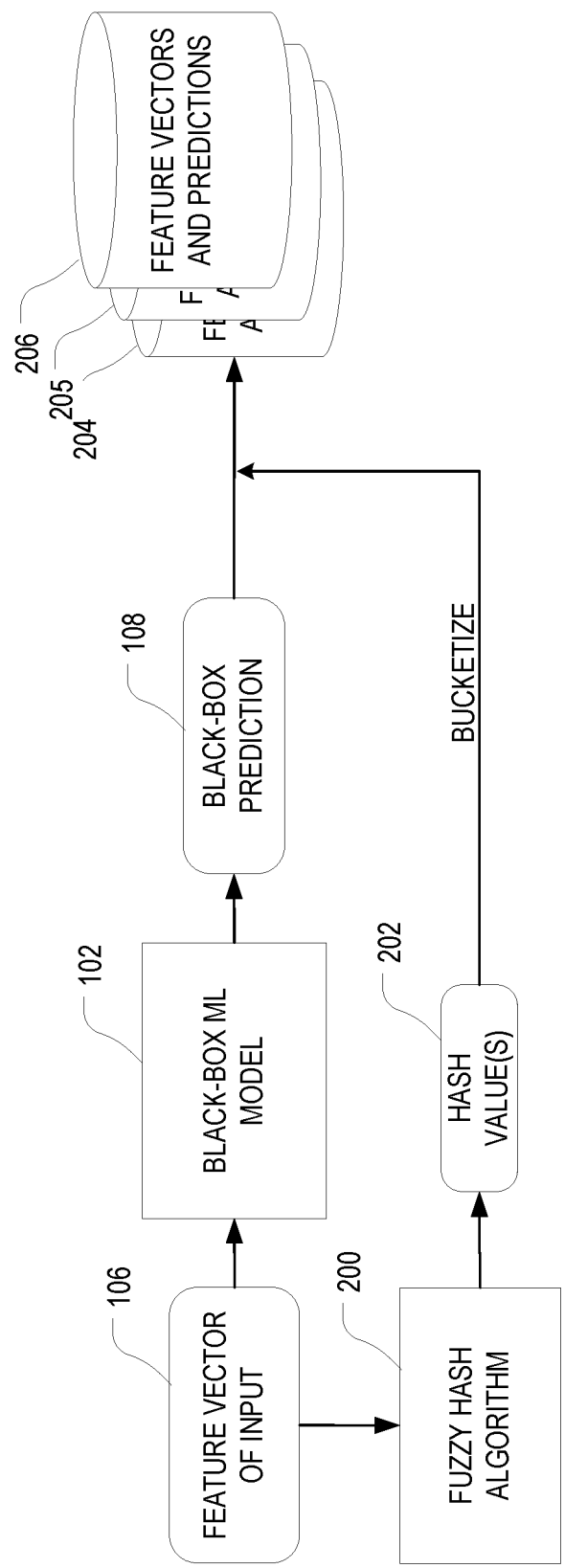
FIGS. 2A and 2B are schematic block diagrams schematically illustrating the use of fuzzy hashing to generate a training dataset for the surrogate model shown in FIG. 1, in accordance with various embodiments.
Figure 2B:
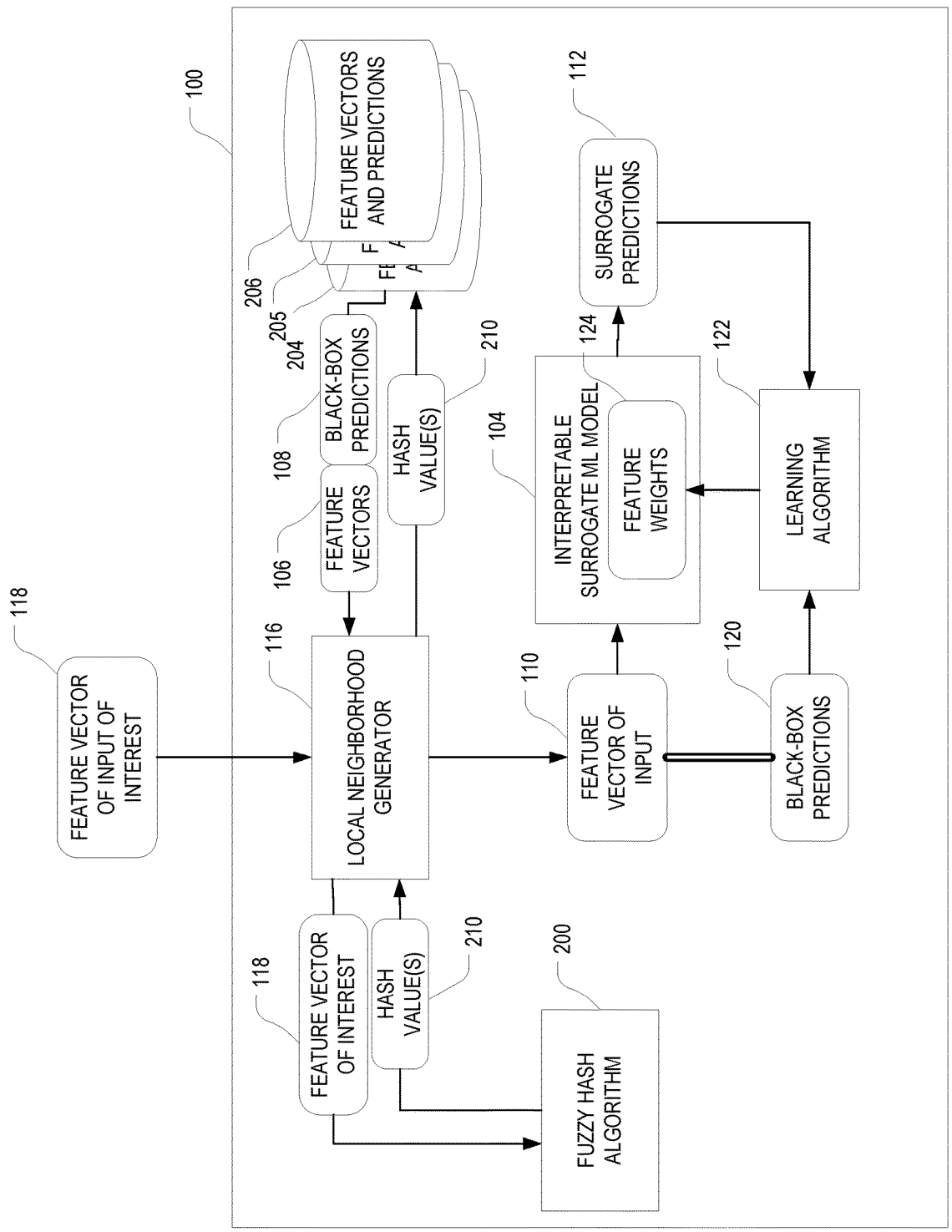

FIGS. 2A and 2B are schematic block diagrams schematically illustrating the use of fuzzy hashing to generate a training dataset for the surrogate model 104 shown in FIG. 1, in accordance with various embodiments. The depicted approach involves hashing at two stages: during training and/or operation of the black-box model 102, and subsequently in the course of interpreting a particular black-box prediction. Both stages utilize the same fuzzy hash algorithm 200, which may be implemented as part of, or as a separate component in communication with, the system 100 for interpreting the predictions of the black-box model 102.

With reference to FIG. 2A, during training or operation of the black-box model 102, as feature vectors of inputs 106 are processed by the black-box model 102 to generate predictions 108, the fuzzy hash algorithm 200 maps at least some of the feature vectors 106 onto hash values 202. The hash algorithm 200, as used herein, is understood to include a set of one or more hash functions. That is, in some embodiments, the hash algorithm 200 includes a single hash function to generate, for each of the feature vectors being hashed, a single hash value 202, while in other embodiments, the hash algorithm 200 includes multiple hash functions that produce multiple respective hash values 202 from each feature vector 106 being hashed. The hash algorithm 200 is deliberately chosen or configured to generate a high number of "collisions," meaning instances in which multiple different feature vectors 106 map onto the same hash value 202 of a single hash function, or overlap in one or more of their computed hash values 202 if multiple hash functions are used. More specifically, a fuzzy hash algorithm, as the term is used herein, matches similar feature vectors onto the same hash or, in the case of multiple hash functions, onto overlapping sets of hashes. Examples of fuzzy hash algorithms include the locality sensitive hashing (LSH) algorithm, which is explained below with respect to FIG. 3, and context-triggered piecewise hashing (CTPH), which uses traditional and rolling hashes to generate a signature of an input that is similar between two similar inputs.

This allows sorting the feature vectors 106 into "buckets" of similar feature vectors 106 based on their hashes. As shown, pairs of feature vectors 106 and their associated black-box predictions 108 are stored in (volatile or non-volatile) computer memory (e.g., in locations 204, 205, 206), bucketized by similarity based on the hash values 202 computed from the feature vectors 106. In practice, each hash value may, for example, serve to address a memory location where all feature vectors 106 that map to that particular hash value 202, along with the associated black-box predictions 108, are stored, or which stores a pointer to another memory location storing the feature vectors 106 and predictions 108. In the case of multiple hash functions, the feature vectors 106 and predictions 108 may be bucketized separately for each function.

With reference to FIG. 2B, when the local neighborhood generator 116 receives a feature vector of interest 118 associated with a black-box prediction 114 for which an interpretation is sought, it passes the feature vector 118 to the fuzzy hash algorithm 200, which computes from the feature vector of interest 118, with the one or more hash functions, a set of one or more hash values 210. The local neighborhood generator 116 then uses the returned hash value(s) 210 to look up feature vectors 106 and predictions 108 that share the hash value(s) 210 with the feature vector of interest 118. For a single hash value 210, the local neighborhood generator 116 may simply retrieve all feature vectors 106 and predictions 108 stored in the memory location (e.g., 204, 205, or 206) storing the respective bucket. When multiple hash functions are used, the local neighborhood generator 116 may retrieve the buckets of feature vectors 106 and predictions 108 associated with the respective multiple hash values 210. The aggregate set of feature vectors 106 and predictions 108 may then be filtered to retain, as the feature vectors 110 and black-box predictions 120 used in training the surrogate model 104, only those pairs which fall in a specified minimum number of the buckets associated with the hash values 210. The specified minimum number of buckets depends on the desired degree of similarity between the retrieved feature vectors 106 and the feature vector of interest 118. For example, in selecting the set of feature vectors 110 of the training set for the surrogate model 104, the local neighborhood generator may use all features 106 that share at least one hash value 202, 210 with the feature vector of interest 118; or only feature vectors that share at least two hash values 202, 210 with the feature vector of interest 118, reflecting a greater degree of similarity; or feature vectors that share all hash values 202, 210 with the feature vector of interest 118, reflecting the greatest degree of similarity captured in the hashes. Alternatively or additionally to filtering the retrieved feature vectors 106, it is also possible to use them all in training the surrogate model 104, but with different weights depending on their similarity to the feature vector of interest. For example, when the learning algorithm 122 computes a cost function from differences between surrogate predictions 112 and corresponding black-box predictions 120, the differences may be weighted based on the similarity of the respective feature vector 110 to the feature vector of interest 118 (with greater similarity receiving a greater weight).

Figure 3:
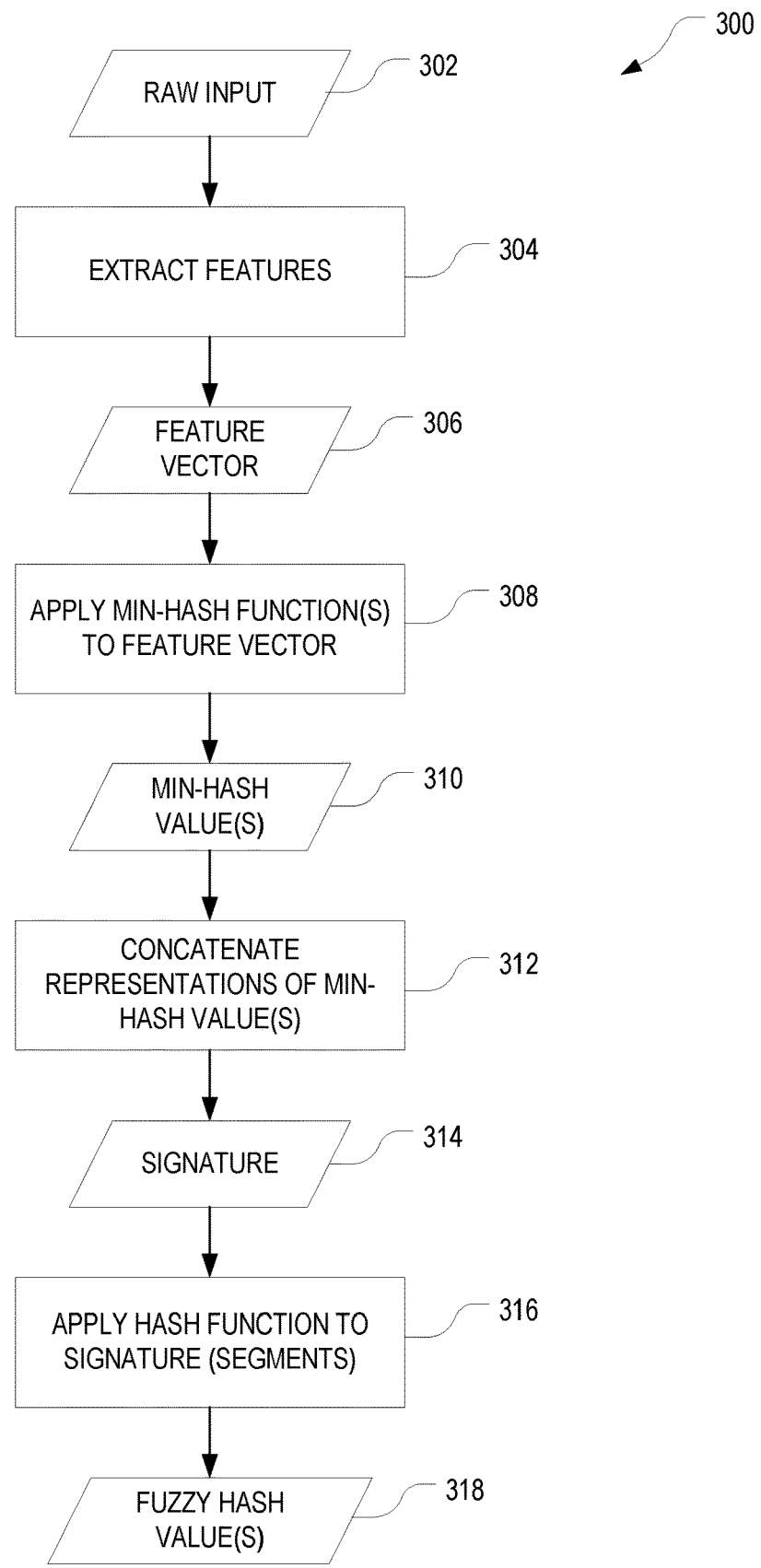
FIG. 3 is a flow chart illustrating locality sensitive hashing in accordance with various embodiments.

FIG. 3 is a flow chart illustrating a method 300 for locality sensitive hashing in accordance with various embodiments. Starting with a raw input 302, the method involves "featurizing" or "vectorizing" that input (act 304), that is, extracting features to generate a feature vector 306 representing the input 302. Suitable feature representations are well-known to those of skill in the art, and generally depend on the type of raw input 302. In the case of a text input, featurizing may involve "shingling" the text, that is, breaking it up into overlapping character sequences of a given length. For example, the text "Hello Sue" may be broken up into the following vector of three-character shingles: [Hel, ell, llo, lo_, o_S, _Su, Sue]. The shingles may be converted to numerical representations, e.g., by concatenating binary representations of the individual letters and converting the resulting binary number into an integer. In some embodiments, the feature vectors for the documents are composed of the (numerical representations of the) shingles themselves in the order in which they appear, and a fixed number of dimensions is achieved by cutting off documents at a corresponding length, or padding feature vectors for short documents, as needed. In other embodiments, a "dictionary" of shingles is created from the union of shingles extracted from a large number of documents, and each individual document is represented by a binary vector indicating, for each shingle in the dictionary, whether that shingle is present in the document. As will be readily appreciated, instead of shingles, words or phrases may also be used to generate the dictionary.

Once the feature vector 306 for a given input 302 has been created, it is "min-hashed" using a set of first hash functions (act 308). Min-hash is a technique that, in effect, randomly selects one of the features of the feature vector 306 by determining a minimum across the feature vector. In some embodiments, N first hash functions are used to generate N min-hash values. More specifically, each of the first hash functions is applied separately to each of the features (in their numerical representations), or elements, of the feature vector 306, and the minimum across the resulting hash values is selected as the min-hash value 310. Consider, for example, a hash function that multiplies the input with seed1, adds seed 2, and takes the last eight bits of the result, which can be represented as an integer. With seed1=230 and seed2=350, this hash function would map the example feature vector [718, 72, 53] as follows:

718→(718*230+350)=165490→01110010→114

72→(72*230+350)=16910→00001110→14

53→(53*230+350)=12540→11111100→252

The minimum of the three hash values 114, 14, and 252 is 14, and that is the min-hash of the vector [718, 72, 53] in this example. Note that the feature vector could be represented, as noted above, as a binary vector indicating for each entry in a feature dictionary whether the respective feature is present or absent in the document. In this case, as an alternative to hashing the features (corresponding to the elements in the binary feature vector that are 1) themselves, a min-hash may be created based on a random permutation of the elements in the feature vector by determining the index of the first element in the permuted feature vector that has a value of 1. The N different hash functions would be provided by N different permutations. This alternative approach is suited for applications with a small to moderate dictionary size. For larger dictionaries, the hash computation based on the features themselves will generally be computationally more efficient.

The N min-hash values 310 generated by the first hash functions from the feature vector 306, or representations of the min-hash value 310, are concatenated to form a signature for the input 302 (act 312). For example, in one embodiment, the set of first functions includes 64 hash functions, and the last two bits of each min-hash value in binary representation are used to create a 128-bit signature 314. The signature 314 may be partitioned into segments, e.g., four segments of 32 bits each, and the binary representation of each segment may be converted to a hexadecimal representation. The signature 314 as a whole may then be written, for example, as a concatenation of the hexadecimal segment representations separated by periods (e.g., B0EFDDD9.13921F45.81C8A7F5.B196D1FE). The segments of the signature 314 are then hashed, in act 316, with a second hash function to generate the fuzzy hash values 318 used in bucketizing feature vectors, one fuzzy hash value for each segment. Note that segmenting the signature 314 is optional; accordingly, the output of the hashing method 300 may be a single fuzzy hash value computed, by the second hash function, from the signature 314. If each input feature vector is mapped onto a single fuzzy hash value, two feature vectors are deemed similar if their hash values match. In embodiments where multiple fuzzy hash values are determined for each feature vector, a degree of similarity can be determined based on the number of matching hash values, and used, e.g., to weight the feature vectors 110 in the training dataset for the surrogate model.

In the preceding description, it was assumed that the black-box model 102, surrogate model 104, and fuzzy hash algorithm 200 all use the same feature representation (up to a possible dimensionality reduction between the representations for the black-box model 102 and the surrogate model 104), meaning that the input features and feature vectors from which the hash values are computed for purposes of determining neighborhoods of similar inputs are the same features and feature vectors as flow into black-box model 102 for making predictions and into the surrogate model 104 for training and subsequent interpretation of the black-box result. As will be appreciated by those of ordinary skill in the art, it is in principle also possible to utilize different feature representations, as long as relevant similarity is still captured in the features on which the hash algorithm operates. Allowing for different feature representations provides greater flexibility in the types of black-box model 102 and surrogate model 104, and makes sense when interpretation is sought on the raw inputs (e.g., images or text) rather than the features utilized by the black-box model. However, it comes at the cost of greater complexity in extracting the fuzzy hashes and rolling up feature importance, as provided by the weights associated with the input features to the surrogate model 104, to the raw features.

Figure 4:
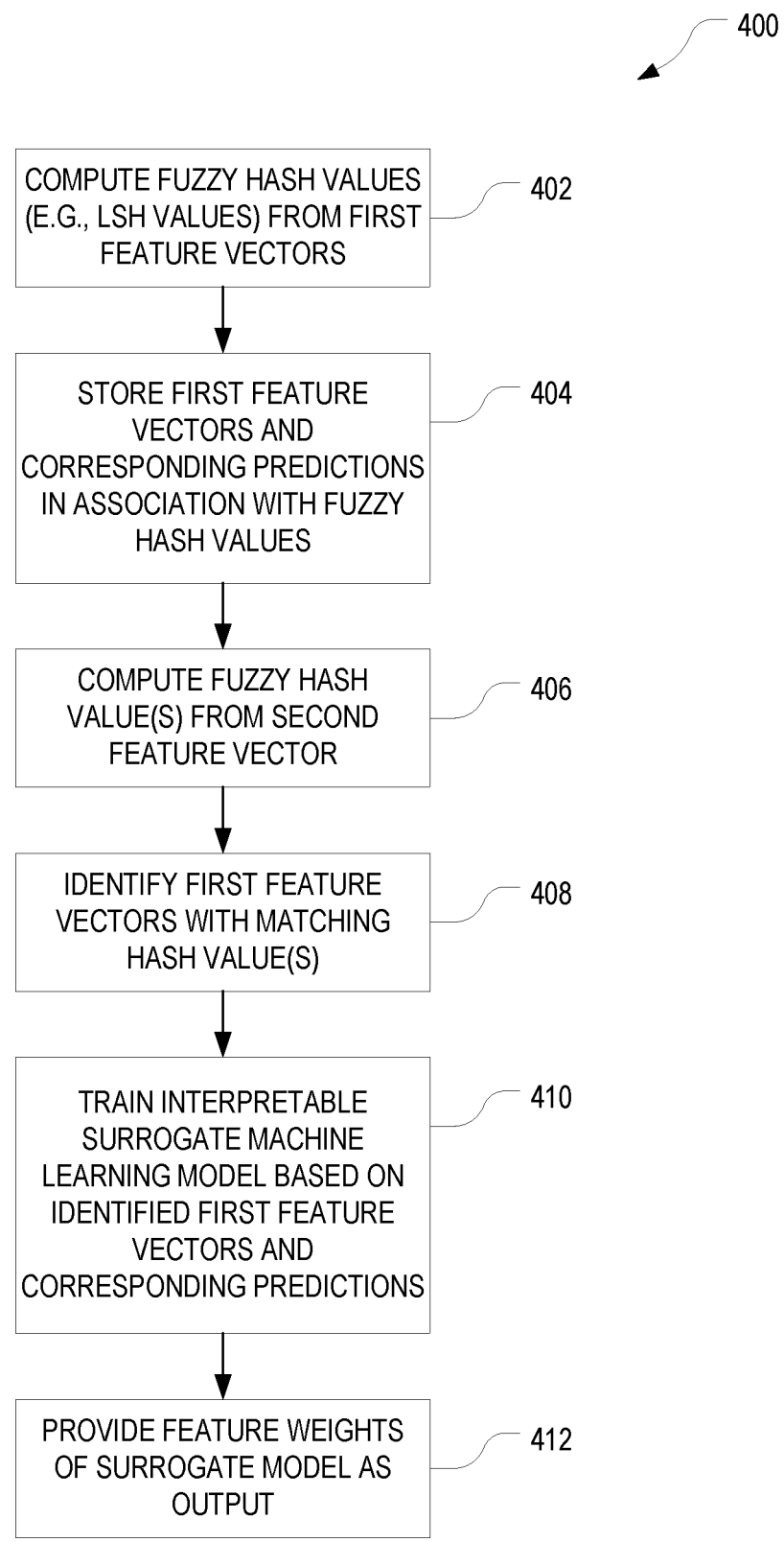
FIG. 4 is a flow chart illustrating a method for interpreting the predictions of a machine learning model, in accordance with various embodiments.

FIG. 4 is a flow chart summarizing a method 400 for interpreting the predictions of a (black-box) machine learning model 102, in accordance with various embodiments. The method 400 includes fuzzy-hashing a plurality of (first) feature vectors representing (first) inputs to the machine learning model (act 402) with a set of hash functions. In some embodiments, the hash functions implement locality sensitive hashing. The (first) feature vectors, optionally paired with the corresponding black-box predictions, are stored in memory, each in association with the one or more fuzzy hash values computed from the (first) feature vector with the set of hash functions (act 404). For example, as explained above, the feature vectors and associated black-box predictions may be stored in groups or buckets of similar feature vectors, at memory locations associated with respective hash values. Alternatively, the hash value(s) for each feature vector may be explicitly stored along with the feature vector.

Subsequently, upon receipt of a new (or second) feature vector of a new (or second) input to the machine learning model and a corresponding prediction computed by the machine learning model from the new feature vector, one or more fuzzy hash values are computed from the new feature vector with the same set of hash functions (act 406). These fuzzy hash values are then used to identify a set of feature vectors among the previously stored first feature vectors that match the second feature vector in one or more of their computed fuzzy hash values (act 408). The identified set of first feature vectors, along with their associated predictions, are used as a dataset for training an interpretable local surrogate machine learning model (act 410). During the course, and as an inherent part, of the training process, the input features to the surrogate model are weighted. Once training is complete, an output that interprets the prediction of the black-box machine learning model is provided based on the feature weights (act 412). The output may, for instance, take the form of a visual output on a computer display, a communication (e.g., email) send to a user, a file generated and stored in memory for future retrieval by a user, or even some automated action taken by the system in response to the interpretation.

In some embodiments, the output provided in act 412 includes a ranking of the input features by feature weight, indicating the relative importance of the features for arriving at the prediction. The features may be directly linked to raw features of the input, such as, e.g., certain words in a text, allowing an intuitive interpretation of the reasons for the prediction. In some embodiments, the output identifies a subset of features, e.g., a fixed number of highest-ranking features, or all features whose associated weights exceed a certain specified threshold weight; these features contribute highly to the prediction. Accordingly, if the prediction is wrong (e.g., as evaluated by a human), removing the high-ranking features from the set of input features that is employed by the black-box model has the potential to improve the model. In some embodiments, the black-box model is retrained following such an update to its feature set. Alternatively to including the highest-ranking features, the output may also identify the lowest ranging features by feature weight, or features whose associated weights fall below a specified threshold; these features do not contribute substantially to the prediction. In this case, the efficiency of the model may be improved by removing the low-ranking features, whose discriminatory value for the prediction is small.

The described approach to interpreting the predictions made by a machine learning model can find application to many types of data and in many industries. For example, in the medical sector, machine learning models may be employed to diagnose various diseases and disease stages, or recommend certain treatment regimen, based on input data such as images (e.g., video of the patient, x-ray images, magnetic resonance images (MRI), etc.), time-varying signals (e.g., electrocardiograms, blood pressure, oxygen level, temperature), tabular data (e.g., patent demographic data including age, gender, etc., qualitative self-assessment of activity levels, mood, etc.; medical history data), and/or other inputs. In this context, it is generally desirable to link a diagnosis or treatment recommendation to the underlying features in the input data that triggered it, both to aid the patient and his/her physician in better understanding the patient's condition, and in the aggregate for research purposes. As another example, in financial and related services, machine learning models may be utilized to determine credit worthiness, insurance risk scores, and the like, where a customer may have a desire, and possibly a legal right, to know the reasons for the machine-determined result. As yet another example, in social networks and similar large electronic information and communication platforms, content is often analyzed and filtered by machine learning models to ensure compliance with laws and policies (e.g., copyright law, prohibitions on various types of harmful or inappropriate content, etc.), resulting in automatic content removal, suspensions of user accounts, and similar enforcement actions that can significantly affect the allegedly offending user. In this situation, the interpretability of the predictions (e.g., classifications) made by the machine learning model is desirable for transparency and fairness.

One particular example application of the system and methods described herein involves the classification of emails, e.g., for the purpose of filtering out phishing emails and spam. A machine learning classifier may be trained based on a labeled training dataset that includes the featurized email texts and/or email metadata (e.g., sender and recipient fields, sending time, subject lines, etc.), along with a (manual) classification as benign email on the one hand and malicious email (e.g., phish) or spam on the other hand. During training of the classifier, a locality sensitive hashing algorithm as described above may be applied to generate a set of hash values for each email, and emails can then be registered as belonging to certain buckets depending on their hash values. Emails that are similar fall in the same hash bucket, allowing efficient search in the hashing space. During subsequent model inference, when the now trained machine learning classifier is used to classify new incoming emails, such a classification may trigger a request for an interpretation or explanation. For this purpose, the locality sensitive hashing algorithm may be applied to the target email to determine one or more hash buckets of similar emails. The identified emails may be weighted based on their proximity to the target email (e.g., as determined in terms of the number of matching hash values), and used, in a weighted manner, to train a surrogate model that provides an interpretation for the classification in the form of a feature ranking. If the target document is misclassified (e.g., as benign when it is in fact malicious), one or more features that cause the misclassification may be identified and removed from the feature set previously utilized by the machine learning model, which can then be retrained with the revised feature set.

FIG. 5 is a block diagram of an example machine 500 that may implement all or part of the system 100 and/or the machine learning model 102 it interprets, and perform any one or more of the methods discussed herein (e.g., methods 300, 400). In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 516 may include a machine-readable medium 522 on which are stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 524 may further be transmitted or received over a communications network 526 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

Example 1 provides a computer-implemented method for interpreting predictions of a machine learning model. The method includes storing, in computer memory, a plurality of first feature vectors of first inputs to the machine-learning model. Each of the first feature vectors is stored in association with at least one fuzzy hash value computed from the first feature vector with at least one hash function. The method further includes, in response to receipt of a second feature vector of a second input to the machine learning model and a corresponding prediction computed by the machine learning model from the second feature vector, using a computer processor to perform operations comprising: computing at least one fuzzy hash value from the second feature vector with the at least one hash function, identifying a set of at least two first feature vectors among the plurality of first feature vectors that each match the second feature vector in at least one of their computed fuzzy hash values, training an interpretable local surrogate model based on the identified set of first feature vectors and corresponding predictions computed by the machine learning model from the first feature vectors, the training comprising determining feature weights associated with a set of at least two input features to the surrogate model, and providing an output based on the feature weights.

Example 2 is the method of Example 1, wherein the output includes an interpretation of the prediction computed from the second feature vector based on an a ranking of the input features by feature weight.

Example 3 is the method of Example 1, wherein the output identifies a subset of the set of input features to the surrogate model, the subset consisting of at least one highest-ranking feature by feature weight or of at least one feature whose associated feature weight exceeds a specified threshold.

Example 4 is the method of Example 3, wherein the input features to the surrogate model are a subset of a set of input features to the machine learning model. Further, in this example, if the prediction computed by the machine learning model from the second feature vector is erroneous, the method further involves removing the identified subset of the set of input features to the surrogate model from a set of input features to the machine learning model.

Example 5 is the method of Example 4, wherein the machine learning model is retrained after removal of the identified subset from the set of input features to the machine learning model.

Example 6 is the method of Example 1, wherein the input features to the surrogate model are a subset of a set of input features to the machine learning model, and the output identifies a subset of the set of input features to the surrogate model. The subset consists of at least one lowest-ranking feature by feature weight or of at least one feature whose associated feature weight falls below a specified threshold. The method further includes removing the identified subset from the set of input features to the machine learning model.

Example 7 is the method of any of Examples 1-6, wherein the fuzzy hash values are computed by locality sensitive hashing.

Example 8 is the method of any of Examples 1-7, wherein the first and second inputs are text inputs and the feature vectors represent shingles of the text inputs.

Example 9 is the method of any of Examples 1-8, wherein computing the at least one fuzzy hash value for each feature vector involves: computing, with first hash functions, respective min-hash values across the feature vector; concatenating representations of the min-hash values of the first hash functions into a signature vector associated with the feature vector; and applying a second hash function to the signature vector to create the at least one fuzzy hash value.

Example 10 is the method of Example 9, wherein the at least one fuzzy hash value includes multiple fuzzy hash values computed by partitioning the signature vector into multiple segments and applying the second hash function to each of the multiple segments.

Example 11 is the method of Example 9 or Example 10, wherein computing the min-hash values with the first hash functions comprises applying each of the first hash functions to each feature in the feature vector to compute feature-wise hash values for the first hash functions, and determining a minimum hash value of the feature-wise hash values for each of the first hash functions.

Example 12 is the method of any of Examples 1-11, further including: determining similarity between each of the identified first feature vectors and the second feature vector based on a number of matching fuzzy hash values; and weighting the identified first feature vectors based on the determined similarity in training the interpretable local surrogate model.

Example 13 is the method of any of Examples 1-12, wherein the local interpretable surrogate model is or includes a decision tree, a linear regression model, a logistic regression model, a least absolute shrinkage and selection operator (LASSO) model, and/or a naïve Bayes classifier model.

Example 14 a computer system including at least one computer processor and computer memory storing a plurality first feature vectors of first inputs to the machine-learning model, each in association with at least one fuzzy hash value computed from the first feature vector with at least one hash function, and instructions which, when executed by the at least one computer processor, cause the at least one computer processor to perform operations for interpreting a prediction computed by the machine learning model from a second feature vector of a second input to the machine learning model. The operations include computing at least one fuzzy hash value from the second feature vector with the at least one hash function, identifying a set of at least two first feature vectors among the plurality of first feature vectors that match the second feature vector in at least one of their computed fuzzy hash values, training an interpretable local surrogate model based on the identified set of first feature vectors and corresponding predictions computed by the machine learning model from the first feature vectors, the training comprising determining feature weights associated with a set of at least two input features to the surrogate model, and providing an output based on the feature weights.

Example 15 is the computer system of Example 14, wherein the operations implement the method of any of Examples 2-13.

Example 16 is a computer-readable medium, or multiple computer-readable media, storing a plurality of first feature vectors of first inputs to a machine-learning model, each in association with at least one fuzzy hash value computed from the first feature vector with at least one hash function, and instructions which, when executed by at least one computer processor, cause the at least one computer processor to perform operations for interpreting a prediction computed by the machine learning model from a second feature vector of a second input to the machine learning model. The operations include computing at least one fuzzy hash value from the second feature vector with the at least one hash function, identifying a set of at least two first feature vectors among the plurality of first feature vectors that match the second feature vector in at least one of their computed fuzzy hash values, training an interpretable local surrogate model based on the identified set of first feature vectors and corresponding predictions computed by the machine learning model from the first feature vectors, the training comprising determining feature weights associated with a set of at least two input features to the surrogate model, and providing an output based on the feature weights.

Example 17 is the computer-readable medium or media of Example 16, wherein the operations implement any of the methods of Examples 2-13.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

The invention claimed is:

1. A computer-implemented method for interpreting predictions of a machine learning model, the method comprising:
    storing, in computer memory, a plurality of first feature vectors of first inputs to the machine-learning model, each in association with at least one fuzzy hash value computed from the first feature vector with at least one hash function;
    in response to receipt of a second feature vector of a second input to the machine learning model and a corresponding prediction computed by the machine learning model from the second feature vector, using a computer processor to perform operations comprising:
    computing at least one fuzzy hash value from the second feature vector with the at least one hash function,
    identifying a set of at least two first feature vectors among the plurality of first feature vectors that each match the second feature vector in at least one of their computed fuzzy hash values,
    training an interpretable local surrogate model based on the identified set of first feature vectors and corresponding predictions computed by the machine learning model from the first feature vectors, the training comprising determining feature weights associated with a set of at least two input features to the surrogate model, and
    providing an output based on the feature weights.

2. The method of claim 1, wherein the output comprises an interpretation of the prediction computed from the second feature vector based on a ranking of the input features by feature weight.

3. The method of claim 1, wherein the output identifies a subset of the set of input features to the surrogate model, the subset consisting of at least one highest-ranking feature by feature weight or of at least one feature whose associated feature weight exceeds a specified threshold.

4. The method of claim 3, wherein the input features to the surrogate model are a subset of a set of input features to the machine learning model, and wherein, if the prediction computed by the machine learning model from the second feature vector is erroneous, the method further comprises removing the identified subset of the set of input features to the surrogate model from a set of input features to the machine learning model.

5. The method of claim 4, further comprising retraining the machine learning model after removal of the identified subset from the set of input features to the machine learning model.

6. The method of claim 1, wherein the input features to the surrogate model are a subset of a set of input features to the machine learning model, wherein the output identifies a subset of the set of input features to the surrogate model, the subset consisting of at least one lowest-ranking feature by feature weight or of at least one feature whose associated feature weight falls below a specified threshold, and wherein the method further comprises removing the identified subset from the set of input features to the machine learning model.

7. The method of claim 1, wherein the fuzzy hash values are computed by locality sensitive hashing.

8. The method of claim 1, wherein the first and second inputs are text inputs and the feature vectors represent shingles of the text inputs.

9. The method of claim 1, wherein computing the at least one fuzzy hash value for each feature vector comprises:
    computing, with first hash functions, respective min-hash values across the feature vector;
    concatenating representations of the min-hash values of the first hash functions into a signature vector associated with the feature vector; and
    applying a second hash function to the signature vector to create the at least one fuzzy hash value.

10. The method of claim 9, wherein the at least one fuzzy hash value comprises multiple fuzzy hash values computed by partitioning the signature vector into multiple segments and applying the second hash function to each of the multiple segments.

11. The method of claim 9, wherein computing the min-hash values with the first hash functions comprises applying each of the first hash functions to each feature in the feature vector to compute feature-wise hash values for the first hash functions, and determining a minimum hash value of the feature-wise hash values for each of the first hash functions.

12. The method of claim 1, further comprising:
    determining similarity between each of the identified first feature vectors and the second feature vector based on a number of matching fuzzy hash values; and
    weighting the identified first feature vectors based on the determined similarity in training the interpretable local surrogate model.

13. The method of claim 1, wherein the local interpretable surrogate model comprises at least one of a decision tree, a linear regression model, a logistic regression model, a least absolute shrinkage and selection operator (LASSO) model, or a naïve Bayes classifier model.

14. A computer system comprising:
    at least one computer processor; and
    computer memory storing:
    a plurality first feature vectors of first inputs to the machine-learning model, each in association with at least one fuzzy hash value computed from the first feature vector with at least one hash function; and
    instructions which, when executed by the at least one computer processor, cause the at least one computer processor to perform operations for interpreting a prediction computed by the machine learning model from a second feature vector of a second input to the machine learning model, the operations comprising:
    computing at least one fuzzy hash value from the second feature vector with the at least one hash function,
    identifying a set of at least two first feature vectors among the plurality of first feature vectors that match the second feature vector in at least one of their computed fuzzy hash values, training an interpretable local surrogate model based on the identified set of first feature vectors and corresponding predictions computed by the machine learning model from the first feature vectors, the training comprising determining feature weights associated with a set of at least two input features to the surrogate model, and providing an output based on the feature weights.

15. The system of claim 14, wherein the output comprises an interpretation of the prediction computed from the second feature vector based on a ranking of the input features by feature weight.

16. The system of claim 14, wherein the output identifies a subset of the set of input features to the surrogate model, the subset consisting of at least one highest-ranking feature by feature weight or of at least one feature whose associated feature weight exceed a specified threshold.

17. The system of claim 16, wherein the input features to the surrogate model are a subset of a set of input features to the machine learning model, and wherein, if the prediction computed by the machine learning model from the second feature vector is erroneous, the operations further comprise removing the identified subset of the set of input features to the surrogate model from a set of input features to the machine learning model.

18. The system of claim 14, wherein the fuzzy hash values are computed by locality sensitive hashing.

19. The system of claim 14, wherein computing the at least one fuzzy hash value for each feature vector comprises:
    computing, with first hash functions, respective min-hash values across the feature vector;
    concatenating representations of the min-hash values of the first hash functions into a signature vector associated with the feature vector; and
    applying a second hash function to the signature vector to create the at least one fuzzy hash value.

20. At least one non-transitory computer-readable medium storing:
    a plurality of first feature vectors of first inputs to a machine-learning model, each in association with at least one fuzzy hash values computed from the first feature vector with at least one hash function; and
    instructions which, when executed by at least one computer processor, cause the at least one computer processor to perform operations for interpreting a prediction computed by the machine learning model from a second feature vector of a second input to the machine learning model, the operations comprising:
    computing at least one fuzzy hash value from the second feature vector with the at least one hash function,
    identifying a set of at least two first feature vectors among the plurality of first feature vectors that match the second feature vector in at least one of their computed fuzzy hash values,
    training an interpretable local surrogate model based on the identified set of first feature vectors and corresponding predictions computed by the machine learning model from the first feature vectors, the training comprising determining feature weights associated with a set of at least two input features to the surrogate model, and
    providing an output based on the feature weights.

* * * * *